Nov. 22, 1955   K. OECHSLIN   2,724,545
DISCHARGE CASINGS FOR AXIAL FLOW ENGINES
Filed Nov. 24, 1950

INVENTOR.
Konrad Oechslin
BY
Attorneys

United States Patent Office 2,724,545
Patented Nov. 22, 1955

2,724,545

DISCHARGE CASINGS FOR AXIAL FLOW ENGINES

Konrad Oechslin, Zurich, Switzerland, assignor to Aktiengesellschaft fuer Technische Studien, Zurich, Switzerland, a corporation of Switzerland Application November 24, 1950, Serial No. 197,350

Claims priority, application Switzerland December 5, 1949

5 Claims. (Cl. 230—133)

This invention relates to discharge casings for axial flow machines, and is especially useful when used in the gas compressors and turbines of power plants of the closed circuit type. Typical embodiments of such closed circuit power plants are illustrated in the patent to Keller 2,172,910, September 12, 1939.

In such plants, the kinetic energy of the working medium issuing from the last stage of the turbine or compressor is still relatively great. However, it is important to the overall efficiency of the plant that the outlet energy of the flowing medium should be recovered as completely as possible in diffusors. A diffusor of high efficiency makes it possible either to increase the efficiency of the plant for an equal velocity of discharge of the working medium from the turbo-engines, or to employ higher velocities in the turbo-engines with equal efficiency and thus to make such engines of smaller dimensions, thereby reducing the cost of construction. The latter factor is especially important in power plants of large output.

In order to give a clear idea of the circumstances in this respect, it is pointed out by way of example that in a plant of the aforesaid type in which a single intermediate heating is effected during the expansion of the working medium and three intercooled stages are provided on the compressor side, with a velocity of discharge of the working medium from a particular end stage of, for example, 100 m./sec., and assuming the diffusor to have an efficiency of 50%, the losses due to incomplete recovery in the diffusor may amount to about 8% of the useful output of the plant. The magnitude of this loss will be appreciated if it is considered that the total flow losses in all the conducting structures and heat exchange apparatus of the same plant are of substantially the same order of magnitude.

Since the working medium in thermal power plants of the type mentioned at the beginning are generally under high pressure and are also at high temperature at the outlet from certain end stages, the discharge casings or diffusors must be made of heat-resistant material. Such material, as is well known, is, however, expensive and also difficult to work, so that the process of manufacture of discharge casings which may even approximately meet the requirements has hitherto been an expensive matter.

The object of the invention is to provide a discharge casing for axial-flow engines which is of satisfactory configuration from the aero-dynamic viewpoint while being still cheap to manufacture.

For this purpose, in accordance with the present invention there is inserted in the discharge casing an element constructed as an axisymmetrical diffusor, whose surfaces contacted by the fluid medium can be completely machined outside the casing. Such an inserted element can be conveniently constructed in two parts.

An embodiment of the subject of the invention is illustrated in simplified form by way of example in the drawings, in which.

Figure 1:
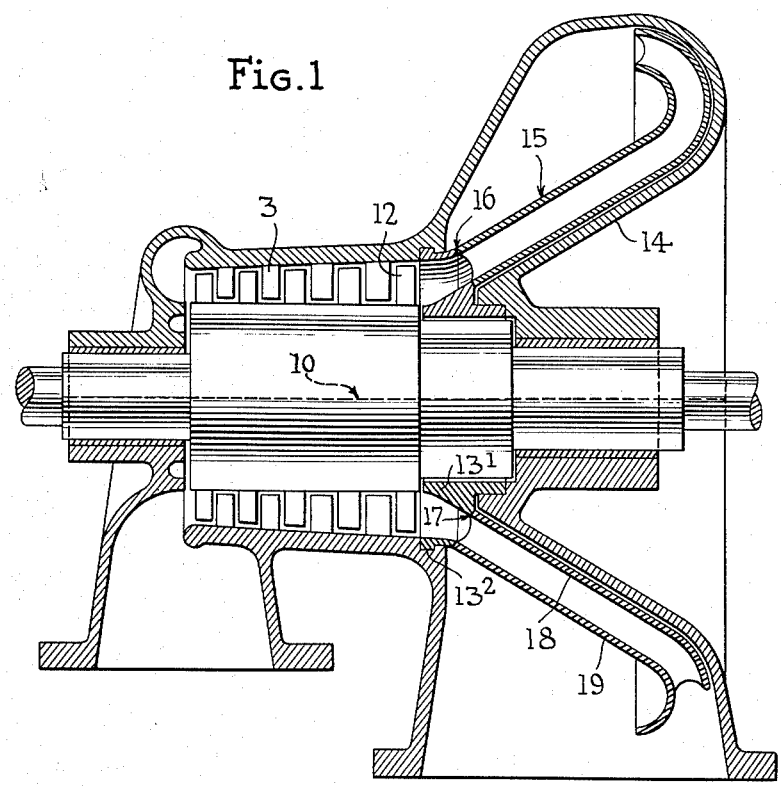
Fig. 1 is an axial section of a turbine element embodying the invention.
Figure 2:
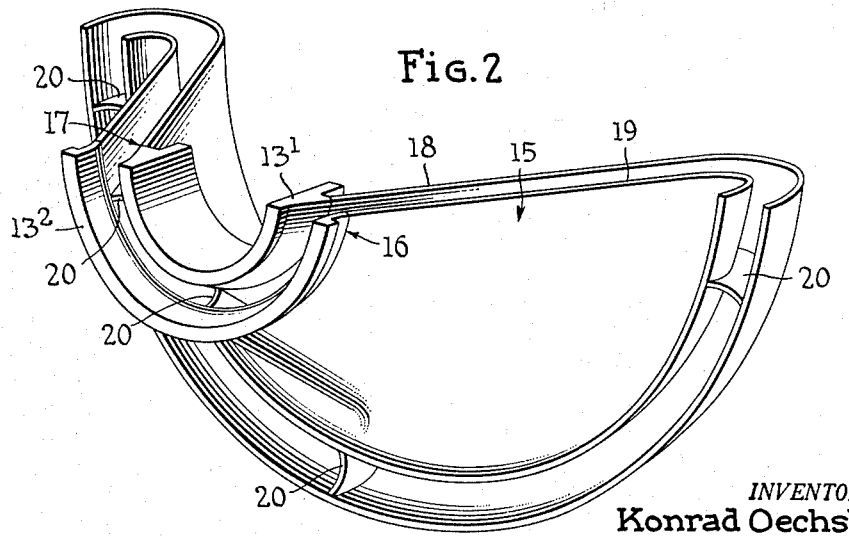
Fig. 2 is a perspective view of one half of the diffuser structure shown in Fig. 1.

While a turbine has been chosen for illustration the invention is adaptable to use in turbine type compressors. In such adaptations of the invention, the construction and the operative principles are the same, but there are differences of form or contour, dictated largely by the necessity of accommodating different flow characteristics of the discharging gaseous working medium.

The turbine is indicated generally by the reference numeral 3 and is an axial flow machine. The invention is concerned with effecting the best possible recovery of the kinetic energy of medium discharging from the machine (in the illustrated case a turbine).

The working medium leaving the last rim of runner vanes 12 of the turbine 3 flows into a short, substantially annular two-part connection branch $13^1$ and $13^2$ respectively, inserted into the discharge casing 14 of the turbine 3. The circular, two-part branch $13^1$ and $13^2$ is adjoined by a two-part element 15 constructed as an axisymmetrical diffusor, which is welded to the branch $13^1$, $13^2$ at the points 16 and 17, and is therefore also inserted in the discharge casing 14. The casing proper of the turbine 3 and its discharge casing 14 are in one piece which is subdivided into an upper and a lower half, in the same way as the branch $13^1$, $13^2$ and the element 15 inserted in the casing 14, in the horizontal plane passing through the longitudinal axis of the turbine 3. The plane of separation is indicated by the broken line 10 in Fig. 1. The two parts of the casing are connected by bolts or other conventional means, not shown. The inserted element 15 is composed of inner and outer sheet metal elements 18 and 19 respectively. Both these elements 18 and 19 are solids of revolution whose common axis forms the extension of the longitudinal axis of the turbine 3. The outer surface of the sheet metal element 18 and the inner surface of the sheet metal element 19 define together a diffusor passage in which the kinetic energy of the working medium issuing from the last rim of the runner vanes 12 is to be converted into pressure with the highest possible efficiency. The elements 18 and 19, which are also in two parts and which are, if necessary, constructed of heat-resistant sheet metal, can be separately machined outside the turbine and brought into the necessary form, the nature of the material of which these elements 18 and 19 are constructed ensuring in itself that as little friction as possible is produced on those surfaces thereof with which the fluid medium comes into contact. The two sheet metal halves can be inserted with comparative ease in the discharge casing 14 in the direction of their circumference from the horizontal plane of the turbine 3, the discharge casing 14 together with the inserted inner sheet metal element 18 serving as a support. In order that the radial distance between the two inserted sheet metal elements 18 and 19 may be maintained, substantially radial ribs 20 are provided between them.

The two-part inserted elements 18, 19, 20 may also consist of a casting, in which case the surfaces swept by the fluid must be completely machined outside the discharge casing 14 before being inserted therein.

The same principles apply to the construction of diffusers for axial flow turbine-type compressors. The curvature and spacing of the members analogous to 18 and 19 must of course be appropriate to the flow characteristics of the discharging medium, as indeed they must be in the illustrated turbine.

It is immaterial to the application of the invention whether the discharge casing is formed integrally with the engine casing of the associated axial-flow machine or is constructed as a separate unit.

What is claimed is:

1. The combination of an axial flow elastic fluid machine comprising a bladed rotor and an enclosing housing having guide blades; a discharge casing separable into two parts on a plane passing through the longitudinal axis of the machine and located at the discharge end of the machine; and a diffuser confined in said discharge casing and removable therefrom when the parts of the casing are separated, said diffuser comprising a supporting neck part defining an annular discharge duct leading from the discharge end of the machine casing and two separately fabricated coaxial substantially conical shells each permanently connected with said neck part, flaring in the direction of flow and spaced to define between them a flow path of progressively increasing cross sectional area, the opposed faces of said shells being highly finished and said diffuser being separable into at least two parts on a plane passing through the longitudinal axis of the machine.

2. The combination defined in claim 1 in which said axisymmetrical shells are of sheet metal and are welded to said neck.

3. The combination defined in claim 1 in which said discharge casing is formed with an annular seat which encloses and confines said supporting neck part.

4. The combination defined in claim 1 in which said discharge casing is formed with an annular seat which encloses and confines said supporting neck part and said shells are of sheet metal, are welded to the neck and have a common axis of symmetry which coincides with the axis of said rotor.

5. The combination defined in claim 1 in which the diffuser shells are separately formed castings and the surfaces thereof swept by the discharging fluid medium are finished surfaces.

References Cited in the file of this patent

UNITED STATES PATENTS

| | | |
|---|---|---|
| 1,082,741 | De Ferranti | Dec. 30, 1913 |
| 1,320,671 | Baumann | Nov. 4, 1919 |
| 1,375,075 | Baumann | Apr. 19, 1921 |
| 2,446,552 | Redding | Aug. 10, 1948 |
| 2,467,168 | Traupel | Apr. 12, 1949 |
| 2,485,447 | Keller | Oct. 18, 1949 |
| 2,495,604 | Salzmann | Jan. 24, 1950 |
| 2,591,399 | Buckland et al. | Apr. 1, 1952 |
| 2,610,786 | Howard | Sept. 16, 1952 |